(12) United States Patent
Friedmann et al.

(10) Patent No.: US 6,368,246 B1
(45) Date of Patent: Apr. 9, 2002

(54) DRIVE UNIT FOR A MOTOR VEHICLE

(75) Inventors: Oswald Friedmann, Lichtenau-Ulm; Ivo Agner, Bad Homburg, both of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/572,171

(22) Filed: May 17, 2000

(30) Foreign Application Priority Data

May 17, 1999 (DE) .......................................... 199 22 576
Sep. 15, 1999 (DE) .......................................... 199 44 118

(51) Int. Cl.$^7$ ............................................... B60R 41/12
(52) U.S. Cl. ............................... 477/37; 477/44; 474/28
(58) Field of Search ....................... 474/18, 28; 477/37, 477/38, 44, 45, 46

(56) References Cited

U.S. PATENT DOCUMENTS 4,665,944 A * 5/1987 Wallace et al. ............. 137/580
5,725,447 A * 3/1998 Friedmann et al. ........... 474/18
6,129,188 A * 10/2000 Friedmann et al. ......... 192/3.58
6,170,508 B1 * 1/2001 Faust et al. .................... 137/12

FOREIGN PATENT DOCUMENTS

DE          195 46 293          6/1996

* cited by examiner

*Primary Examiner*—Sherry Estremsky
*Assistant Examiner*—Tisha D. Lewis
(74) *Attorney, Agent, or Firm*—Darby & Darby

(57) ABSTRACT

A drive unit with a continuously variable cone-pulley transmission as used particularly in motor vehicles comprises a pressure valve and an OR-gate valve with slide pistons sharing a common valve bore. An interposed push member serves to reduce or eliminate transverse forces between the slide pistons.

8 Claims, 3 Drawing Sheets

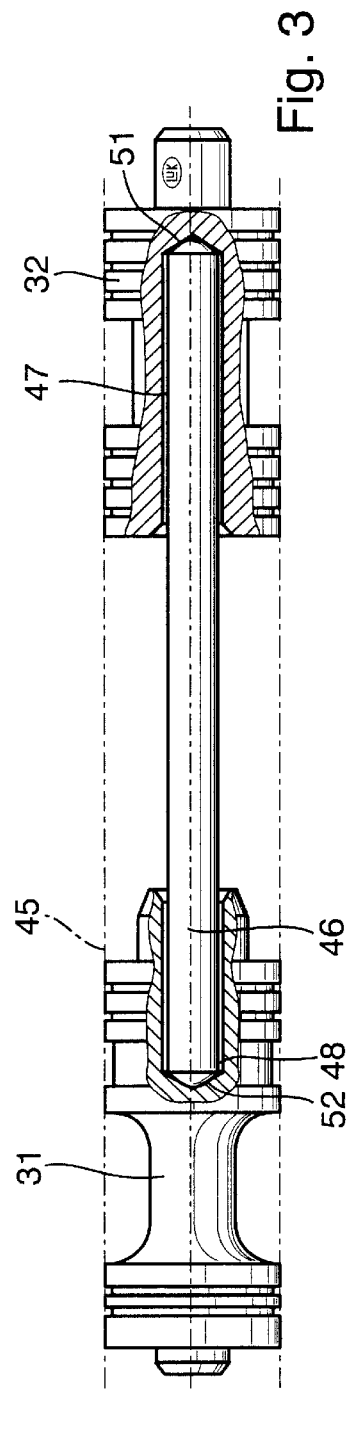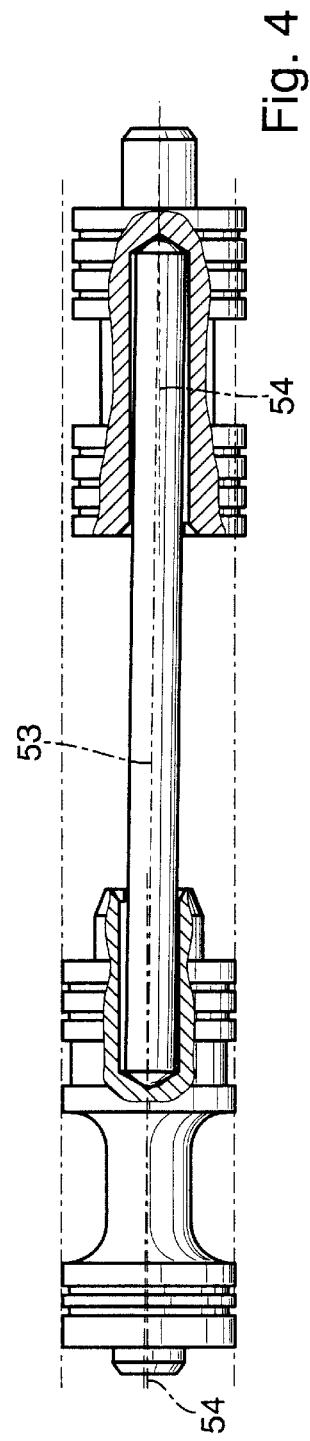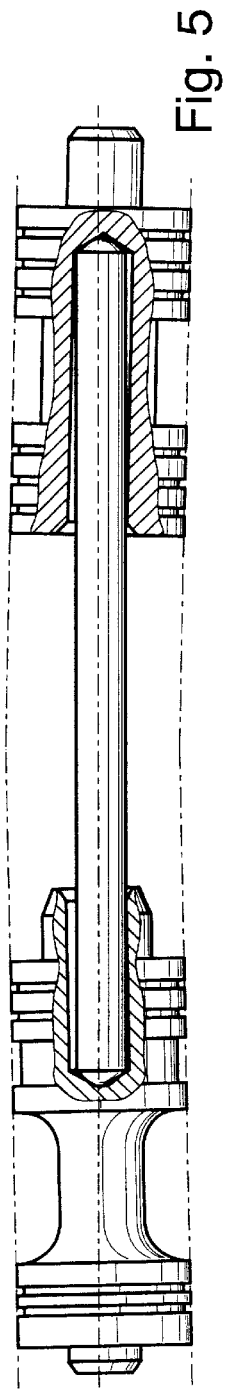

DRIVE UNIT FOR A MOTOR VEHICLE

BACKGROUND OF THE INVENTION

The invention relates to a drive unit, particularly for motor vehicles, with a continuously variable cone-pulley transmission, i.e., a transmission that has pairs of conical disks at the input and output sides, respectively, and a chain-belt to transmit torque from one pair of conical disks to the other. The gripping force by which each pair of conical disks holds the chain-belt is applied through belt-tightener control members that are subjected to a pressure which is supplied at least in part by a torque sensor. At least one of the pairs of conical disks has, in addition, a ratio-setting control member. While the belt-tightener control members provide the gripping force, the at least one ratio-setting control member serves to set or change the transmission ratio, i.e., to shift the transmission. The at least one ratio-setting control member receives an amount of pressure that is regulated by a transmission-ratio valve as required to set the ratio that is called for at each point in time. In state-of-the-art arrangements of the kind that the invention relates to, the pressure provided by the transmission-ratio valve can be influenced by a pressure valve that works together with an OR-gate valve. A drive unit of this kind is known from DE 195 46 293 A1.

In the known drive unit of the publication just mentioned, the pressure valve cooperates with the OR-gate valve in such a manner that, if a quick shift of transmission ratios and thus a quick delivery of pressure to the ratio setting servo control member is required and if this pressure delivery cannot be effected to a sufficient extent by the torque sensor because the latter is transmitting only a low level of torque at the particular moment, the pressure valve supplies the transmission-ratio valve with a sufficient level of pressure for a quick position change of the pairs of conical disks and thus a quick shift of transmission ratios. The OR-gate valve in this arrangement receives two different return pressures from the transmission-shifting pressure circuit and automatically takes on a position where only the higher of the two pressures can have an effect on the pressure valve. The OR-gate valve as well as the pressure valve are configured as slide-piston valves and are combined in an arrangement where the respective slide pistons of the OR-gate valve and the pressure valve push against each other.

This known drive unit has an excellent performance record from actual practical use, but a possibility of problems has been recognized in the area of the cooperation between the OR-gate valve and the pressure valve, due to transverse forces occurring at the point where the respective slide pistons of the pressure valve and the OR-gate valve are in contact with each other. The two slide pistons of the known drive unit are arranged in a common cylinder bore hole and push against each other at the place where they are in mutual contact. When a pressure is applied to the slide piston of the OR-gate valve, a normal force in the axial direction of the cylinder bore hole is transferred to the slide piston of the pressure valve. Extended use of the drive unit may cause wear on the valve bore hole, so that the two slide pistons could settle into an angled position in relation to each other. Also, the valve bore receiving the two pistons may already have an initial out-of-straight condition because of production tolerances, which creates another situation where the two slide pistons are not in flush contact against each other.

These problems will have the effect that the force transfer from one valve piston to the other will not be free from transverse forces, so that there is a risk of a valve piston taking on a skewed position inside the valve bore due to the transverse force component. As a natural consequence, the skewed position, in turn, will lead to an increased rate of wear on the valve. Consequently, the condition of the combined system of pressure valve and OR-gate valve can deteriorate to the point where the pressure required by the ratio-shifting valve can no longer be supplied at the prescribed level, so that the desired quick shifting of the ratio of the cone-pulley transmission can no longer be delivered.

OBJECT OF THE INVENTION

It is therefore the object of the present invention to further develop the known drive unit so that a required capability for quick ratio-shifting of the cone-pulley transmission is maintained even after long-term use or in the presence of imperfections in the valve bore.

SUMMARY OF THE INVENTION

To meet the foregoing objective, the invention provides a drive unit, particularly for motor vehicles, with a continuously variable cone-pulley transmission, i.e., a transmission that has pairs of conical disks at the input and output sides, respectively, with a chain-belt to transmit torque from one pair of conical disks to the other. The gripping force by which each pair of conical disks holds the chain-belt is applied through belt-tightener control members that are subjected to a pressure which is supplied at least in part by a torque sensor. At least one of the pairs of conical disks has in addition a ratio-shifting control member. While the belt-tightener control members provide the gripping force, the at least one ratio-shifting control member serves to set or change the transmission ratio, i.e., to shift the transmission. The at least one ratio-shifting control member receives an amount of pressure that is regulated by a transmission-ratio valve as required to set the ratio that is called for at each point in time. The pressure provided by the transmission-ratio valve can be influenced by a pressure valve that works together with an OR-gate valve. The force acting between the pressure valve and the OR-gate valve is conducted through an interposed push member which, to a large extent, eliminates transverse force components.

Advantageous embodiments of the invention have, individually or in combination, the features that the OR-gate valve has a slide piston movable in a valve housing, the pressure valve has a slide piston movable in a valve housing, the respective slide pistons of the OR-gate valve and the pressure valve are arranged in a common bore hole of the valve housing.

It is further of advantage if the interposed push member through which the force is transmitted between the slide piston of the OR-gate valve and the slide piston of the pressure valve is at least in part received inside bore holes of the respective slide pistons of the OR-gate valve and the pressure valve in such a way that the push member has freedom of axial movement inside the piston bore holes.

In advantageous embodiments of the invention, the interposed push member is seated in the bore holes of the slide pistons with radial play and axial mobility. Thus, the push member can be moved axially in the slide-piston bores of the OR-gate valve and the pressure valve while the outside circumference of the push member ha s radial clearance from the interior wall of the slide-piston bore. It is advantageous if the radial play is large enough so that the outside circumference of the push member maintains radial clearance from the inside wall of the slide-piston bore in case that the valve bore in which the two slide pistons move does not run true or the two slide pistons are not in alignment with each other. The clearance of the push member inside the slide-piston bore is designed to be wide enough that the outside of the push member will not touch the wall of the slide-piston bore as long as the maximum straightness errors of the valve bore are within the given production tolerance.

According to a further developed embodiment of the invention, the end portions of the interposed push member and the bottom ends of the slide-piston bores are designed as an articulated link connection. The mobility of the link allows the longitudinal axes of the push member, the slide piston of the OR-gate valve, and the slide piston of the pressure valve to position themselves at an angle to each other. The radial play between the push member and the walls of the bore holes in the slide pistons of the OR-gate valve and the pressure valve is wide enough so that even with non-alignment between the interposed push member and the slide pistons of the OR-gate valve and the pressure valve, there is no contact between the outside circumference of the push member and the walls of the bore holes in the respective slide pistons of the OR-gate valve and the pressure valve.

In the arrangement just described, it is advantageous if the end portions of the push member are shaped as spheres or spherical segments and the ends of the slide-piston bore holes are shaped as cones or spherical segments. Thus, when the spherical or spherical segment-shaped ends of the push member are in contact with the conical or spherical segment-shaped ends of the slide-piston bore holes, the contact is a linear contact along a circle, as opposed to a contact between abutting surfaces. Due to the advantageous contacting arrangement, the longitudinal axes of the push member and the slide-piston bore holes of the OR-gate valve and the pressure valve can position themselves at angles to each other as described above.

It has proven to be advantageous if the slide-piston bore hole of the OR-gate valve reaches from the open end of the hole all the way into the opposite axial end portion of the OR-gate slide piston. In the case of the pressure valve, the slide-piston bore hole can extend from an open end to an axial location near a shutter edge of the slide piston of the pressure valve. To add length to the slide-piston bore of the pressure valve, the slide piston can have a tubular lengthwise extension radially surrounding the push member on the outside.

Thus, the invention removes the problem of the slide pistons of the OR-gate valve and the pressure valve being pushed into skewed positions due to the occurrence of transverse forces. When a force is transmitted between the slide pistons, the force is introduced in each of the slide pistons at the deeply recessed end of the respective slide-piston bore, where the longitudinal axes of the interposed push member and the slide pistons are allowed to position themselves at an angle to each other, thereby providing the mobility of a link that reduces the skewing moments acting on the slide pistons as a result of the transverse forces. Thus, if the precise-fitting shape of the valve bore has deteriorated as a result of wear, or if the two slide pistons are not in true alignment, the slide pistons can no longer fall into a twisted or skewed position inside the valve bore due to transverse forces.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing in which

FIG. 3 represents a similar view as FIG. 2, but without the helix spring;

FIG. 4, in a similar view as FIG. 3, shows the misalignment of the two slide pistons in relation to each other;

FIG. 5, in a similar view as FIG. 3, illustrates an out-of-straight error of the valve bore.

DETAILED DESCRIPTION OF THE INVENTION

Figure 1:
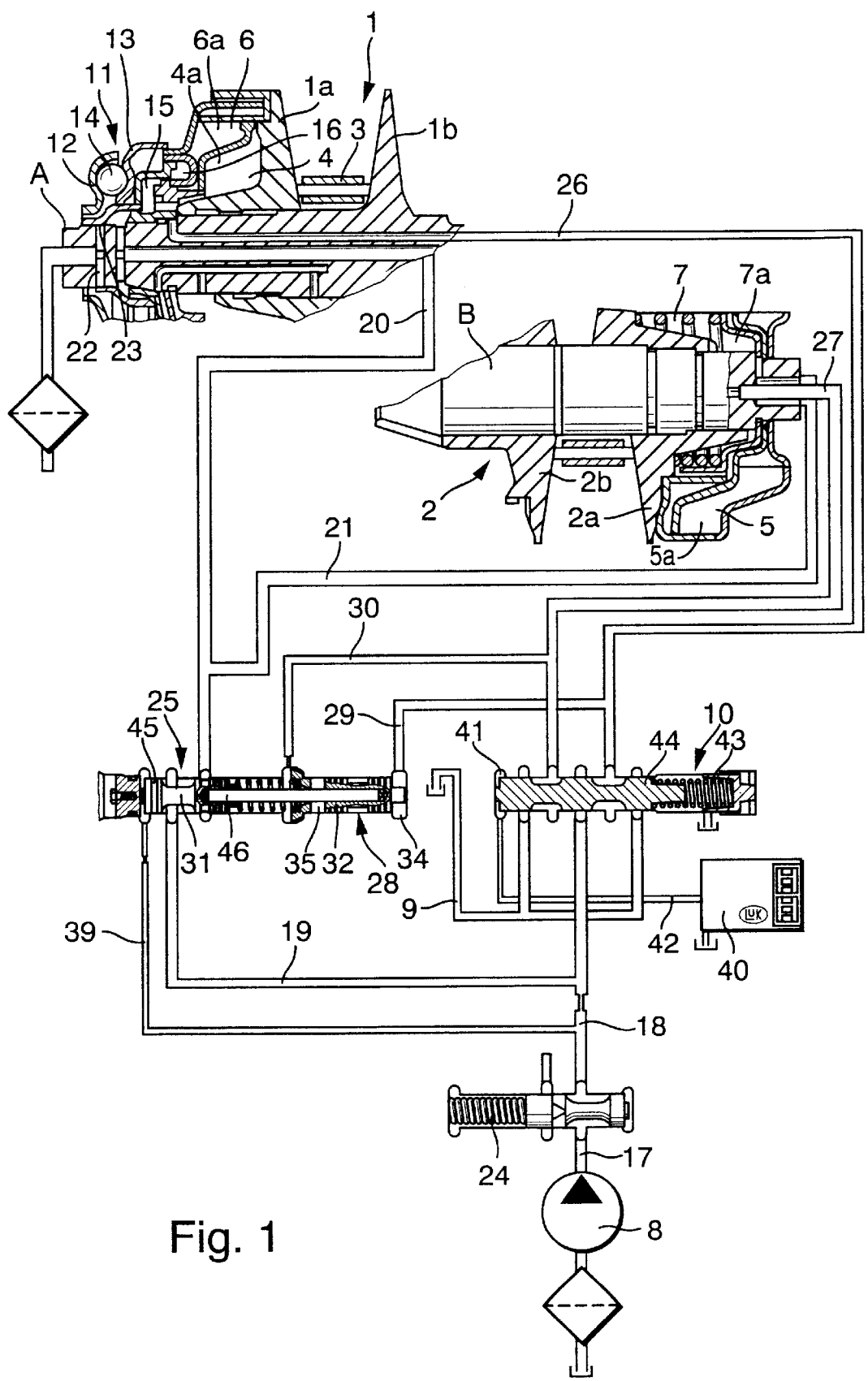
FIG. 1 represents an overall view of a drive unit according to the invention.

FIG. 1 of the drawing gives an overall view of the parts of a drive unit according to the invention. On the input side, a pair of conical disks 1 is mounted in a rotationally locked connection on a shaft A. Analogous to the input pair of disks 1, another pair of conical disks 2, associated with the output side of the drive unit, is mounted in a rotationally locked connection on a shaft B. Each of the pairs of conical disks 1 and 2 has an axially fixed conical disk 1b, 2b, respectively, and an axially movable disk 1a, 2a. An endless flexible torque-transmitting device, in this case a chain 3, loops around the disk pairs 1, 2 to transmit torque from one to the other.

The disk pair 1 can be axially tightened by means of a piston/cylinder unit 4 which functions in such a way that a pressure introduced into piston/cylinder unit 4 causes an axial displacement of the axially movable conical disk 1a. In analogous manner, the axially movable conical disk 2a can be axially displaced on the shaft B by means of a piston/cylinder unit 5 in order to tighten the chain 3 against the axially fixed conical disk 2b.

In addition to the piston/cylinder units 4, 5, further piston/cylinder units 6, 7 are provided for shifting the transmission ratio. The shifting function is performed by injecting or removing pressure medium, e.g., oil, in the pressure compartments 6a, 7a of the piston/cylinder units 6, 7 in accordance with the required transmission ratio. The pressure medium can be supplied by a pump 8 which can be followed downstream by a volume-flow limiting valve 24. To remove pressure medium, the pressure compartments 6a, 7a can be connected to a drain conduit that leads to a sump. To effect a ratio change of the transmission, one of the two pressure compartments 6a, 7a is pressurized by an inflow of more pressure medium while the volume of the other of the two compartments is at least part-way reduced by letting pressure medium escape through the drain conduit 9. A valve 10 serves to direct the inflow and outflow of pressure medium.

A torque sensor 11 is mounted on the shaft A and serves to generate a pressure that depends at least in part on the torque that needs to be transmitted. The torque sensor 11 transfers the torque entering the shaft A to the input-receiving pair of conical disks 1. In the torque sensor, the torque is transmitted through a ramp disk 12 that is axially fixed on the shaft A but has a limited amount of rotational mobility. Facing the ramp disk 12 is an axially movable ramp disk 13 separated from disk 12 by ramp roller bodies such a spherical balls 14. A rotation of the ramp disk 12 in relation to ramp disk 13 causes the balls 14 to run up on the ramps so that a rotary displacement of the ramp disk 12 causes an axial displacement of the ramp disk 13.

The torque sensor 11 has a pressure compartment 15 that is connected to the pump 8 by way of the conduits 18, 19, 20. The pressure compartment 15 serves to generate a variable pressure of a magnitude that depends on the torque that is to be transmitted. The conduit 20 has a branch 21 through which the pressure compartment 7a of the piston/cylinder unit 7 can be connected to the pump 8. The pressure compartment 4a of the piston/cylinder unit 4 communicates with the pressure compartment 15 of the torque sensor 11 by way of a conduit that is not specifically indicated in the drawing. A drainage channel 22 running through shaft A can be connected to the pressure compartment 15 of the torque sensor 11. With the axial displacement of the ramp disk 13 of the torque sensor 11, as described above, an opening 23 in the shaft A functioning as a valve can allow pressure medium to exit through the drainage channel 22. The valve 23 in combination with the drainage channel 22 forms a throttle. The ramp disk 13 by virtue of its axial displacement functions as a regulating piston that closes or opens the valve opening 23 to a degree that depends on the torque to be transmitted, so that a pressure originating from the pump 8 can be built up in the pressure compartment 15 of the torque sensor 11. An analogous amount of pressure is also communicated through the aforementioned but not specifically illustrated connection from the pressure compartment 15 to the pressure compartment 4a. Furthermore, a corresponding pressure is also propagated through the conduits 20 and 21 to the pressure compartment 5a of the second piston/cylinder unit 5. The pressure for setting or changing the transmission ratio of the cone-pulley transmission is built up in the pressure compartments 6a and 7a. Due to the parallel arrangement of the piston/cylinder units 4, 5 and the piston/cylinder units 6, 7, the forces produced by the ratio-setting pressure are additively superimposed on the torque-dependent belt-tightening forces that are generated in the pressure compartments 4a, 5a.

In addition to the previously mentioned pressure compartment 15, the torque sensor has a second pressure compartment 16 that can be connected to the pressure compartment at an operating point that depends on the transmission ratio of the cone-pulley transmission, so that the hydraulic combination of the two pressure compartments 15 and 16 provides an increase in the effective axially oriented surface. The two pressure compartments are connected or disconnected as a function of the axial displacement of the axially movable conical disk 1a. To this effect, the conical disk can be used as a valve part in cooperation with a suitable arrangement of connecting channels or bore holes in the components of the disk pair 1 and the torque sensor 11. It can be of advantage, if only the first pressure compartment 15 is pressurized over most or all of the underdrive part of the range of the cone-pulley transmission. The merging of the two pressure chambers 15 and 16 can occur at the point where the transmission changes from a speed-reducing mode to a speed-amplifying mode, i.e., at the point where the transmission ratio is approximately 1:1. As a result of this arrangement, the pressure can be modulated as a function of the torque and also as a function of the transmission ratio, with the ratio-dependent modulation being superimposed on the torque-dependent modulation. The switch-over from pressurizing the first pressure compartment 15 alone to pressurizing both pressure compartments 15, 16 at a transmission ratio of 1:1 has the effect that in the underdrive range of the transmission, i.e., in a speed-reducing mode, only the first pressure compartment 15 is pressurized, while in the overdrive range of the transmission, i.e., in a speed-amplifying mode, both of the pressure compartments 15 and 16 are pressurized. Thus, with a given amount of input torque at the input of the torque sensor 11, the pressure generated by the torque sensor is greater when the transmission is in an underdrive mode, because the pressure is acting only against the effective surface of compartment 15, in contrast to an overdrive mode of the transmission where the combined hydraulically effective surface of compartments 15 and 16 is available to convert the pressure into an axial force. Consequently, the pressure generated by the torque sensor is smaller in the high-speed range than in the low-speed range.

Figure 2:
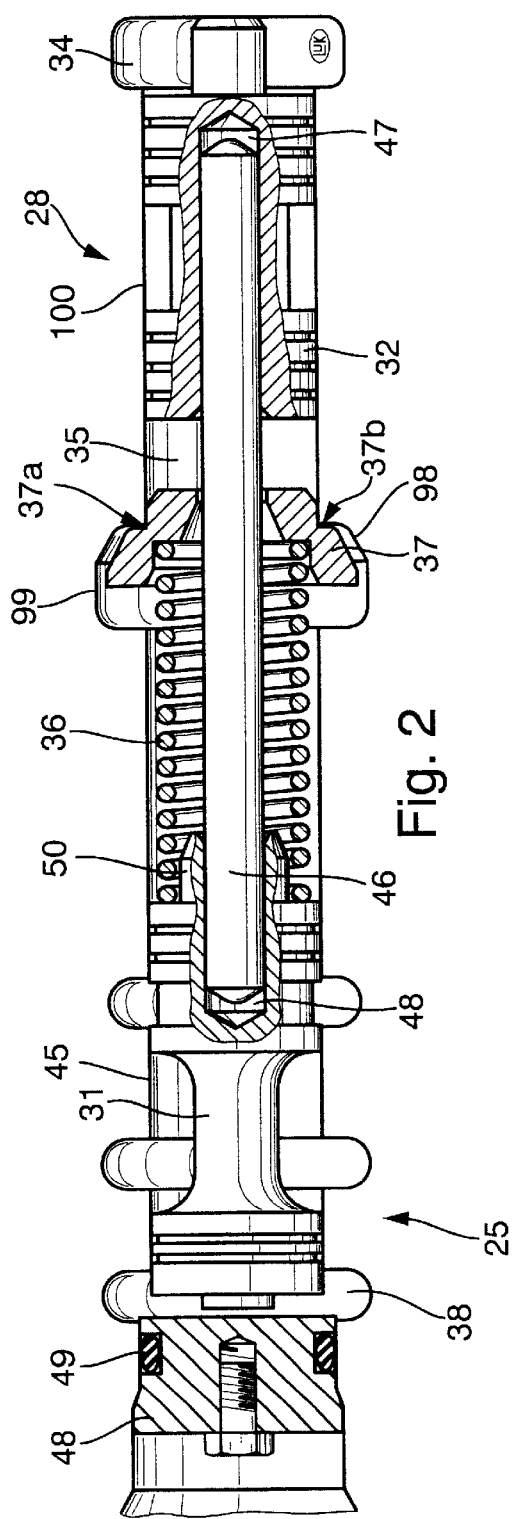
FIG. 2 represents an enlarged view of the slide pistons of the OR-gate valve and the pressure valve that are arranged in a common valve bore hole.

A flow-volume limiting valve 24 is arranged downstream of the pump 8 and the channel 17 of FIG. 1. The flow-volume limiting valve 24 serves to limit the rate of volume flow of the constant volume stream that is delivered by the pump 8. The pump 8 also pressurizes the torque sensor 11 in addition to the piston/cylinder units 4, 5 and 6, 7. A pressure valve 25, which cooperates with an OR-gate control element or OR-gate valve 28, serves to increase the pressure upstream of the valve 10 that serves to set or change the ratio of the cone-pulley transmission. Thus, the pressure valve 25 in combination with the OR-gate valve 28 ensures that the pressure in conduit 18, i.e., upstream of the valve 10, is higher than the pressure required in the conduits 26, 27 that supply the piston/cylinder units for the setting or changing of the transmission ratio. As can be seen in FIG. 1, the pressure valve 25 also has a connection to the torque sensor 11 and the piston/cylinder unit 4 by way of the conduit 20. There is further a connection between the pressure valve 25 and the piston/cylinder unit 5 by way of the conduit 21. As discussed previously, the torque-dependent pressure in the pressure compartments 4a, 5a depends on the pressure delivered by the torque sensor 11 and thus on the magnitude of the torque received by the torque sensor 11. As explained above, it is possible to use the torque sensor to generate a ratio-dependent pressure modulation that is superimposed on the torque-dependent pressure modulation. In a case where the torque sensor is receiving only a small amount of torque and, accordingly, the pressure generated by the torque sensor is small, it is possible that in a critical situation the ratio-dependent pressure could be inadequate for a desired quick change of the transmission ratio. This kind of condition will occur, e.g., with a strong deceleration of the vehicle at low engine torque, where a rapid change of the transmission ratio is required. To ensure an adequate pressure level upstream of the valve 10 and thus a sufficient amount of pressure in the conduits 26, 27 for pressurizing the ratio-actuating piston-cylinder units 6, 7 for a rapid change of transmission ratio in this kind of situation, the pressure valve 25 is provided as a part of the hydraulic transmission-control system. The pressure valve 25 in combination with the OR-gate valve 28 causes the conduit 20 to receive a lower amount of pressure which, in turn, causes the pressure in conduits 18, 19, i.e., upstream of the ratio-actuating valve 10, to rise. Consequently, the pressure existing ahead of the valve 10 will be higher than the pressure in conduits 26, 27. The pressure levels existing in the conduits 26, 27 are returned by way of conduits 29, 30 to a functional unit consisting of the pressure valve 25 and a valve of the type of the OR-gate valve 28. The pressure valve 25 has an axially movable slide piston 31 contained in a valve cylinder bore 45. Also arranged for axial movement within the same valve cylinder bore 45 is a slide piston 32 of the OR-gate valve 28. The two slide pistons 31, 32 are moveable independently of each other along the axial direction of the valve cylinder bore 45. The details of the arrangement of the pressure valve 25 and OR-gate valve 28 are shown in FIG. 2.

The two slide pistons 31, 32 push against each other through an interposed push member 46. The return conduit 29 is connected to a pressure compartment 34, and the return conduit 30 is connected to a pressure compartment 35 located axially between the slide pistons 31 and 32. If the pressure in the conduit 27 and thus also in the return conduit 30 is higher than in the conduit 26 and return conduit 29, then the higher pressure will fill the pressure compartment 35 and act directly on the slide piston 31 of the pressure valve 25. In the opposite case, i.e., if the pressure in the conduit 26 and thus also in the return conduit 29 is higher than in the conduit 27 and return conduit 30, the higher pressure will fill the pressure compartment 34 and act against the slide piston 32 which, through the push member 46, pushes the slide piston 31 in the direction where the pressure valve 25 will become closed. This explains how the valve 28 functions as an OR-gate valve, where in each case the higher of the respective pressures in the return conduits 29, 30 is applied to the slide piston 31 of the pressure valve 25. A compression spring 36 is pre-tensioned, bearing at one end against a holding ring 37 seated in the valve housing containing the valve bore 45 and at the other end against the slide piston 31. The spring 36 is pre-tensioned with an appropriate force, so that a minimum amount of pressure required for shifting the transmission ratio exists in the conduit 19 upstream of the valve 10. On the opposite side from the spring 36, the slide piston 31 faces a pressure compartment 38 and is thereby exposed to a pressure that corresponds to the pressure in conduit 18, i.e., the pressure that exists upstream of the ratio-shifting valve 10. If the pressure in the conduits 18 and 19 exceeds a certain minimum, the pressurization of the slide piston 31 by way of the pressure compartment 38 causes the slide piston 31 to open a passage to the conduits 20, 21 and to the torque sensor 11. Thus, the compression spring 36 and the combination of the pressure valve 25 and OR-gate valve 28 determine the minimum pressure in the conduits 18 and 19. Also, as a result of the pressures acting on both sides of the slide piston 31, i.e., from the pressure compartment 38 and from whichever of the conduits 26, 27 carries the higher pressure, the same arrangement provides the desired pressure differential between the higher of the pressures in the conduits 26 or 27 on the one hand and the pressure upstream of the ratio-shifting valve 10 on the other.

The embodiment of the drive unit as shown in FIG. 1 includes a proportional valve 40 which, by way of a conduit 42, pressurizes a pressure compartment 41 of the ratio-shifting valve, where a pre-tensioned spring 43 is arranged to counteract the force exerted by the pressure in the pressure compartment 41. When the pressure compartment 41 is not pressurized, the pre-tensioned spring 43 pushes the slide piston 44 of the ratio-shifting valve 10 into a position where a passage is opened between the conduit 27 and the drain conduit 9 and another passage is also opened between the conduit 26 and the conduit 18, 19 upstream of the ratio-shifting valve 10 by way of corresponding shutter edges of the slide piston 44. Thus, the connection to the drain conduit 9 keeps the conduit 27 essentially pressure-free, while the conduit 26 is pressurized by the full strength of the pressure supplied by the pump 8. This condition causes the transmission to shift towards a high speed.

When the pressure compartment 41 of the ratio-shifting valve 10 is pressurized by the proportional valve 40, the slide piston 44 is moved to the right, opposed by the force of the spring 43, so that the conduit 27 can be supplied with pressure from the conduit 18 on the input side of the ratio-shifting valve and the conduit 26 is connected to the drain conduit 9. This condition causes the transmission to shift towards a slow speed. The pressure in the pressure compartment 41 can be set through an appropriate control input into the proportional valve 40, whereby the respective pressure levels in conduits 26 and 27 can be set at any point between the full strength of the supply pressure and essentially zero strength, i.e., the pressure-free condition that occurs when one of the conduits is connected to the drain conduit 9. The control input into the proportional valve 40 can be provided by a suitable electronic control unit.

As is immediately evident from FIG. 2 of the drawing, the push member 46 is arranged to be axially movable in a piston bore hole 47 of the slide piston 32 of the OR-gate valve and in a piston bore hole 48 of the slide piston 31 of the pressure valve 25. The valve bore 45 containing the two slide pistons 31, 32 can be closed by a stopper plug 48 with a ring seal 49, as shown in the left-hand part of the drawing FIG. 2.

The slide piston 31 of the pressure valve 25 has a tube-shaped extension 50 on the side of the slide piston 31 facing towards the holding ring 37, serving to extend the piston bore hole 48 and also providing on the outside a centering collar for the compression spring 36.

The holding ring 37, which serves as a seat for the spring 36, is supported on one side by the housing, more specifically, by a shoulder of a recess 99 of the housing. The spring 36 pushes axially against the holding ring 37, so that the latter, in turn, is held against the housing. At the same time, the holding ring 37 serves as a centering device for the spring 36. Preferably, the holding ring 37 is arranged in a through hole of the housing, and the outside diameter of the spring 36 is less than the diameter of the long bore of the valve. The holding ring 37 has two centering diameters 37a and 37b, the larger of which (37a) is on a shoulder by which the holding ring is centered in the valve bore, and the smaller is the inside diameter 37b of a recess on the opposite side where the spring 36 is centered in the holding ring. The centering diameter 37a corresponds to the bore diameter 100 of the valve bore.

It is advantageous if the holding ring 37 and the recess 99 are of a shape allowing the holding ring to be mounted only in its correct orientation. This can be achieved, e.g., by providing a taper 98.

The holding ring 37 is a metal part, e.g., formed out of solid metal or sheet metal. However, in another embodiment, the holding ring 37 can also be made of a polymer material.

FIG. 3 shows an analogous representation of the inventive arrangement as FIG. 2, but without the compression spring 36.

FIG. 3 represents an "ideal" position of the two slide pistons 31, 32 inside the valve bore 45, i.e., a position in which there is neither a misalignment of the two slide pistons 31, 32 in relation to each other nor an imperfection in the shape of the valve bore 45.

In a position of the two slide pistons 31, 32 as shown in FIG. 3, the ends 51, 52 of the interposed push member 46 are bearing against the respective ends of the piston bore holes 47, 48, i.e., against the bottoms of the bore holes 47, 48.

If the pressure compartment 34 is pressurized through the conduit 29 and the slide piston 32 is thereby urged leftwards in the plane of the drawing, the force that is generated in this process is transferred by way of the push member 46 to the slide piston 31. To visualize the function of the push member 46, FIG. 4 shows a misaligned condition of the slide pistons 31, 32, and FIG. 5 shows an out-of-straight condition of the valve bore 45, both of the drawings giving an exaggerated representation.

A misaligned condition that could occur in the two slide pistons 31, 32, e.g., after long-term use of the drive unit, would lead to a transverse force component acting on the slide pistons 31, 32. The transverse force component, in turn, could cause the slide pistons to settle into a skewed position that would further increase the wear on the valve bore 45.

The interposed push member 46 provides an articulated connection so that, with a misaligned condition of the two slide pistons 31, 32, the longitudinal axis 53 of the push member 46 will take an angled position to the respective longitudinal axis 54 of each slide piston 31, 32. The push member 46 has sufficient clearance from the walls of the piston bore holes 47, 48 of the slide pistons 31, 32, so that the angled position of the latter will not cause the push member 46 to touch the walls of the piston bore holes 47, 48. The clearance gap can be of the order of 0.1 mm to 0.2 mm.

FIG. 5 of the drawing illustrates, in an exaggerated view, the case of an out-of-straight error of the valve bore 45. In the representation shown, the valve bore 45 has a curvature that is particularly noticeable in the left half of the drawing, so that the slide piston 31 of the pressure valve 25 takes on an oblique position. Because the push member 46 functions as a swivel-jointed link between the areas where the ends 51, 52 meet the bottoms of the respective piston bore holes 47, 48, the bottom of the piston bore hole 48 in relation to the end 52 of the push member 46 can tilt from the "ideal" alignment of FIG. 3. As in the preceding case illustrated in FIG. 4, the radial play of the push member 46 inside the piston bore hole 48 prevents the push member 46 from touching the wall of the piston bore hole 48.

Figure 6:
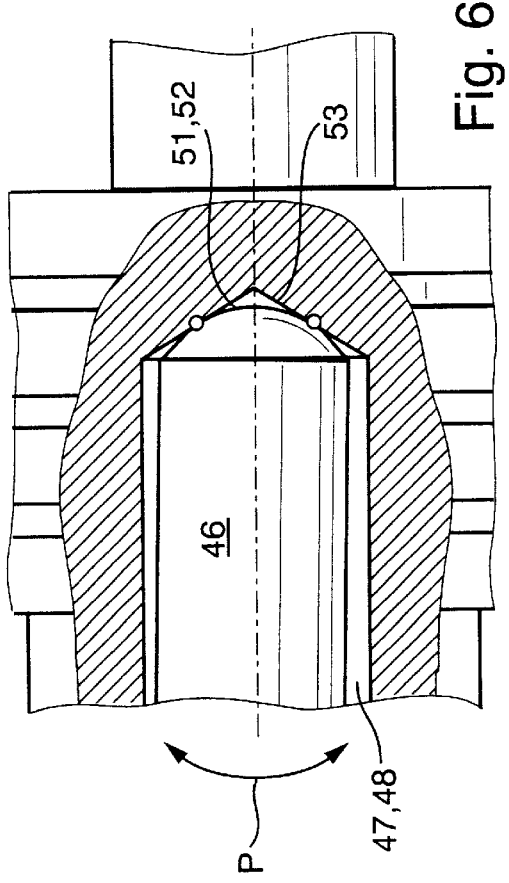
FIG. 6 represents an enlarged view of the end portion of the interposed push member and the slide-piston bore hole.

FIG. 6 of the drawing represents an enlarged detail view of one of the end portions 51 or 52 of the push member 46 inside the respective piston bore hole 47 or 48.

In the embodiment of the push member 46 as illustrated in FIGS. 4 and 5 as well as in the magnified detail drawing of FIG. 6, the end portions 51, 52 are shaped as spherical segments, so that each of the end portions 51, 52 is in linear contact along a circle with the concave-conical bottom 55 of the respective piston bore hole 47, 48. If the two slide pistons 31, 32 become misaligned as illustrated in FIG. 4, or if the valve bore has an out-of-straight error as shown, e.g., in FIG. 5, the result will be a displacement of the end portions 51, 52 of the push member 46 in relation to the bottom 55 of the respective piston bore hole 47, 48, as indicated by the arrow P in FIG. 6. In other words, the central longitudinal axis 53 of the push member 46 can position itself at an angle to the respective longitudinal axes 54 of the slide pistons 31, 32, so that a relative movement can take place at the swivel joints that are constituted by the end portions 51, 52 of the push member 46 and the bottoms 55 of the respective piston bore holes 47, 48. As a result of this arrangement, no transverse forces are transmitted at the contact between the push member and the bottoms 55 of the bore holes in the slide pistons 31, 32.

While in the preceding embodiment, the contact between the interposed push member and the bottoms of the slide piston bore holes has been described as a combination of the spherical ends of the push member with conical bottoms of the piston bore holes, the bottoms of the piston bore holes could also have the shape of spherical segments, which would likewise allow the contacts to function as swivel joints.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A drive unit for a motor vehicle with a continuously variable transmission, comprising:
    a first pair of conical disks associated with an input side of the continuously variable transmission,
    a second pair of conical disks associated with an output side of the continuously variable transmission,
    an endless chain-belt arranged to transmit torque between the first and second pairs of conical disks,
    a first belt-tightener control member associated with the first pair of conical disks and a second belt-tightener control member associated with the second pair of conical disks, the first and second belt-tightener control members being supplied with a pressure produced at least in part by a torque sensor to generate a compressive force for gripping the chain-belt,
    at least one ratio-shifting control member associated with at least one of the pairs of conical disks to shift a transmission ratio of the continuously variable transmission,
    a transmission-ratio valve supplying the at least one ratio-shifting control member with an amount of pressure depending on the transmission ratio to be set,
    a cooperative arrangement of a pressure valve and an OR-gate valve to influence the amount of pressure supplied to the transmission-ratio valve, wherein the OR-gate valve and the pressure valve interact with each other through an interposed push member so that transverse force components are for the most part eliminated, and
    wherein the OR-gate valve has a first slide piston, the pressure valve has a second slide piston, and wherein further the first and second slide pistons are arranged in a common valve bore of a common valve housing, wherein the interposed push member is received with axial mobility at least partially inside piston bore holes of the first and second slide pistons, wherein the interposed push member has radial play inside the piston bore holes.

2. The drive unit of claim 1, wherein the radial play is sufficient to leave a radial gap around the interposed push member inside the piston bore holes even in the case where the cooperative arrangement has at least one of the defects consisting of a misalignment between the first and second slide pistons and an out-of-straight condition of the valve bore.

3. The drive unit of claim 1, wherein the piston bore hole of the first slide piston extends from one axial end of the first slide piston to an axial location near an opposite end of the first slide piston.

4. The drive unit of claim 1, wherein the piston bore hole of the second slide piston extends from one axial end of the second slide piston to an axial location near a shutter edge of the second slide piston.

5. The drive unit of claim 1, wherein the second slide piston has a tubular axial projection extending the piston bore hole of the second slide piston.

6. A drive unit for a motor vehicle with a continuously variable transmission, comprising:

- a first pair of conical disks associated with an input side of the continuously variable transmission,
- a second pair of conical disks associated with an output side of the continuously variable transmission,
- an endless chain-belt arranged to transmit torque between the first and second pairs of conical disks,
- a first belt-tightener control member associated with the first pair of conical disks and a second belt-tightener control member associated with the second pair of conical disks, the first and second belt-tightener control members being supplied with a pressure produced at least in part by a torque sensor to generate a compressive force for gripping the chain-belt,
- at least one ratio-shifting control member associated with at least one of the pairs of conical disks to shift a transmission ratio of the continuously variable transmission,
- a transmission-ratio valve supplying the at least one ratio-shifting control member with an amount of pressure depending on the transmission ratio to be set,
- a cooperative arrangement of a pressure valve and an OR-gate valve to influence the amount of pressure supplied to the transmission-ratio valve, wherein the OR-gate valve and the pressure valve interact with each other through an interposed push member so that transverse force components are for the most part eliminated, and
- wherein the OR-gate valve has a first slide piston, the pressure valve has a second slide piston, and wherein further the first and second slide pistons are arranged in a common valve bore of a common valve housing, wherein the interposed push member is received with axial mobility at least partially inside piston bore holes of the first and second slide pistons, wherein the interposed push member has axial end portions bearing against bottom ends of the piston bore holes with a freedom of movement analogous to swivel joints.

7. The drive unit of claim 6, wherein the axial end portions of the interposed push member are of a spherical shape.

8. The drive unit of claim 6, wherein the bottom ends of the piston bore holes are from the category of shapes that consists of cones and spherical segments.

* * * * *